Jan. 28, 1964   F. R. BUESSELER ETAL   3,119,176
METHOD OF MAKING A CAPILLARY TUBE FLUID
FILLED TRANSMISSION SYSTEM
Filed May 24, 1961
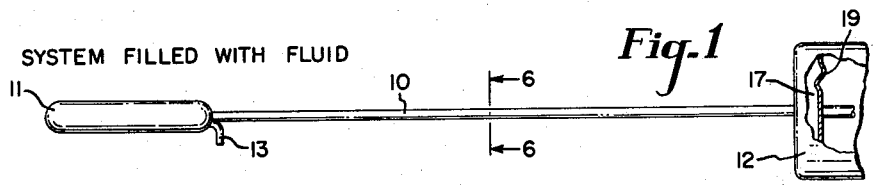
*Fig. 1*
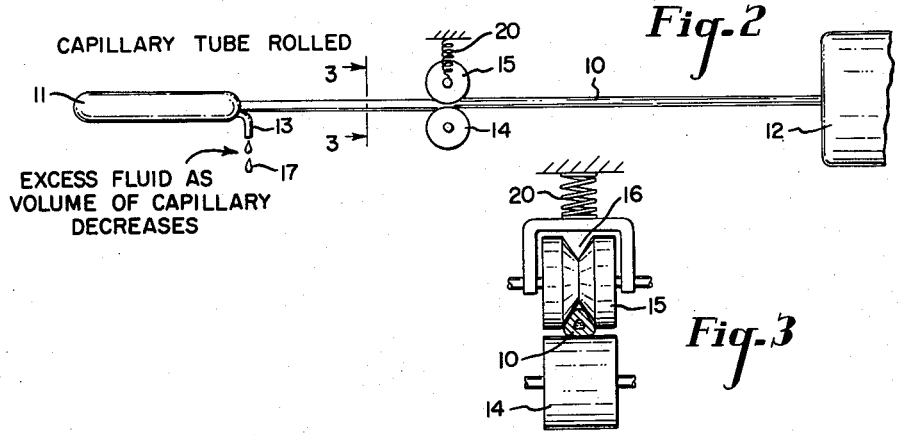
*Fig. 2*
*Fig. 3*
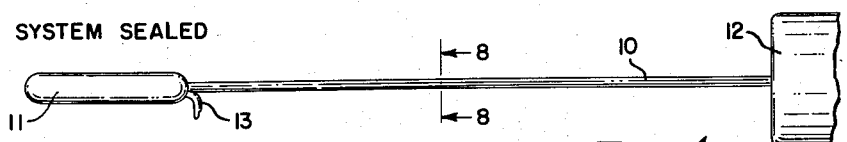
*Fig. 4*
*Fig. 5*   *Fig. 6*   *Fig. 7*   *Fig. 8*
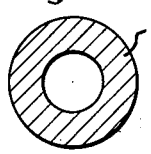 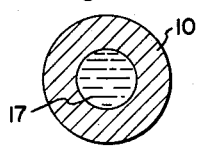 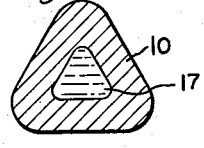 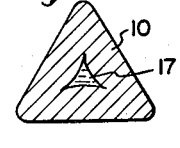
CAPILLARY TUBE
NOT FILLED   FLUID FILLED   ROLLED WITH FLUID
INVENTORS
FRANK L. BUESSELER
WILLIAM L. CARLSON, JR.
BY Clyde C. Blinn
ATTORNEY

United States Patent Office 3,119,176
Patented Jan. 28, 1964

3,119,176
METHOD OF MAKING A CAPILLARY TUBE FLUID FILLED TRANSMISSION SYSTEM
Frank R. Buesseler and William L. Carlson, Jr., Bloomington, Minn., assignors to Minneapolis-Honeywell Regulator Company, Minneapolis, Minn., a corporation of Delaware
Filed May 24, 1961, Ser. No. 112,337
4 Claims. (Cl. 29—400)

The present invention is concerned with a new and novel method of making a capillary tube fluid transmission system; in particular, the method involves the filling of the transmission system with fluid and after the capillary tube is filled, the tube is rolled to decrease the bore volume and form the bore to have a cross sectional area of a triangular shape.

In capillary fluid transmission systems where the output of an actuator depends upon an increase in volume of the fluid in a bulb or sensing element, the recognition that the amount of fluid in the capillary tube must be kept at a minimum has presented numerous problems. Sometime ago, a method of decreasing the capillary tube bore cross sectional area after the tube has been filled with the noncompressible fluid by rolling the tube and allowing the excess fluid to escape from the system before the system is sealed was recognized.

The present invention provides for a fluid filled system which has a capillary tube with a very small internal bore dimension. The method of making the capillary tube comprises the introduction of noncompressible fluid or medium into the system and then the rolling or pressing of the capillary tube to reduce the bore cross sectional area to provide a bore cross sectional area having a triangular shape. By means of the triangular shape, the resistance to flow is less for a given cross sectional area. This is a very important factor as the volume of the fluid in the capillary must be maintained at a minimum and yet the flow resistance must be kept as small as possible.

Therefore, an object of the present invention is to provide an improved method of making a capillary, fluid-filled transmission system by decreasing the capillary tube bore cross sectional area and maintaining the area in a triangular shape.

Another object of the present invention is to provide an improved method of making a capillary fluid transmission system with a minimum volume of fluid and a minimum resistance to flow.

These and other objects of the present invention will become apparent upon a study of the following specification and drawing in which:

FIGURE 1 is a view of the fluid-filled system having a bulb, a capillary tube, and an actuator;

FIGURE 2 is a schematic showing of the rolling operation wherein the capillary tube is rolled to decrease the cross sectional area of the internal bore and provide a triangular shaped tube with a triangular shaped bore cross sectional area;

FIGURE 3 is a schematic showing of a rolling apparatus to provide the step shown in FIGURE 2;

FIGURE 4 is a view of the system which has been sealed after the cross sectional area of the capillary tube is reduced and the excess fluid in the system has been removed;

FIGURE 5 is a cross sectional showing of a capillary tube which is not filled with fluid;

FIGURE 6 is a cross sectional showing of a capillary tube of the type shown in FIGURE 4 with the fluid fill; and FIGURES 7 and 8 are cross sectional views of the capillary tube after the rolling operation with the cross sectional area having a triangular shape.

Referring to FIGURE 1, a capillary tube fluid transmission system is shown. A capillary tube 10 which might be of any length and have a cross sectional area as shown in FIGURE 5 is connected at one end to a bulb or temperature responsive unit 11. At the other end of the capillary tube an actuator 12 is connected. The temperature responsive bulb is hollow; so that, when the bulb is filled with a medium or fluid 17 such as a vapor or a noncompressible fluid which changes in volume upon the change in temperature, a response indicative of the temperature is obtained at the actuator. The actuator is of a conventional type which has a means or diaphragm 19 to which a change in volume of the fluid therein produces an output. One particular type of actuator has a flexible diaphragm across one side of a chamber so a change in the volume of the fluid therein produces a mechanical movement of the diaphragm and thus associated apparatus which is connected to the diaphragm. With the housing of the system connected as shown, bulb 11, capillary tube 10, and the chamber of actuator 12 are filled with the fill medium or fluid 17 through a tube 13 attached to the bulb. Since the cross sectional area of the bore of the tube 10 is quite large as shown in FIGURE 4, very little difficulty is experienced in filling the system with fluid. If any air or compressible fluid is left in the housing or in the tube during the filling operation, various methods of removing the compressible fluid are available without very much difficulty. Whenever the cross sectional area of the capillary tube is substantially as shown in FIGURE 4 or has a relatively large cross sectional area dimension, the filling operation without the introduction of air or compressible fluid is readily done.

After the system is completely filled with non-compressible fluid, the capillary tube is rolled as shown in FIGURE 2. The schematic showing of the rolling operation involves a fixed roller 14 and a movable roller 15 which is spring biased against the tube by associated spring 20. Roller 15 has a V-shaped groove 16 to shape the tube in a triangular shape of varying degrees as shown in FIGURES 7 and 8 depending on the force of spring 20. While the rolling operation in FIGURE 2 is shown schematically, the rolling operation may take various forms even the use of a plurality of rollers; however, a number of passes over the complete length of the capillary tube is made until the dimension or internal bore of the capillary tube is substantially as shown in FIGURE 7. If a greater reduction in the internal bore cross sectional area is desired, more rolling operations or a greater pressure of the rollers during each operation is made to obtain the bore cross sectional area substantially as shown in FIGURE 8.

A capillary bore cross sectional area as shown in FIGURE 7 has the definite advantage over other shapes. In order to reduce the bore cross sectional area of a capillary tube, some type of rolling operation must be used to make the operation practical. Obviously, the best shape for the internal bore would be circular; however, such a shape would require a very complicated type of rolling mechanism. In a roller mechanism for decreasing the bore cross sectional area of a capillary tube, the triangular shaped area has a number of advantages. The cross sectional area is not only reduced as much as possible depending upon the number of times the rolling operation is made or the pressure applied to the rollers, but the triangular shape has a minimum surface area for a given cross sectional area. Since the surface dimension plays a very important part in determining the friction of the fluid as it moves through the tube, the greatest cross sectional area for the least amount of surface area surface is desired. In order to reduce the friction of the fluid flowing through the capillary tube, the selection of the triangular shape has proven the most satisfactory. In any capillary system of this type, the response of the system is cut down when the bore cross sectional area of the capillary tube is small there is a definite resistance to flow of the fluid through the capillary tube. When the temperature of the bulb 11 as shown in FIGURE 4 increases, the fluid in the bulb will expand and push fluid through tube 10 to the actuator. If the resistance of flow through tube 10 is great, a greater change in the temperature of the fluid in bulb 11 will be necessary to overcome the flow resistance. Such phenomena due to this flow resistance will add lag to the system. While the disadvantage could be overcome by increasing the bore cross sectional area to reduce the flow resistance, an increase in the bore cross sectional area would increase the volume of the fluid in tube 10. Since the fluid in tube 10 may change in temperature due to the change in temperature of the surrounding air resulting in an effect due to changes in ambient temperature which would be adverse to the system, the volume of tube 10 should be maintained at a minimum. By selecting the volume or cross sectional area as shown in FIGURE 7, the flow resistance for a given cross sectional area is a minimum which greatly increases the response of the system.

When the capillary tube is rolled with greater pressure or more times to have a cross sectional area as shown in FIGURE 8, the walls of the internal bore become concave; so that, for a given cross sectional area, the periphery around the area is a minimum.

The method has been described as applied to a capillary liquid transmission system; however, the invention is applicable to other fluid-filled capillary tube systems whether vapor or liquid is used as a fill. The intention of the applicant is to limit the invention only by the scope of the appended claims in which we claim:

1. The method of making a thermostat element having a remote bulb connected by a fluid-filled tube to a pressure responsive actuator to form a fluid-filled system, which consists of attaching a bulb and an actuator to opposite ends of a length of round tube, filling the bulb, the tube and the actuator with a relatively noncompressible fluid at an opening, rolling the tube to reduce the cross sectional area to a triangular shape so the center bore has a substantially triangular cross sectional area, and sealing said opening to prevent the loss of fluid when the fluid in the bulb expands.

2. In a method of making a noncompressible fluid-filled control apparatus in which an increase in volume of the fluid in a sensing unit is reflected to a pressure operated control device through a capillary tube connection, attaching a sensing unit and a pressure operated control device to the opposite ends of a length of round tube, filling said sensing unit, said tube and said actuator with fluid through a free opening, rolling said tube to reduce the cross sectional bore to a triangular shape with the excess fluid flowing from said free opening, and sealing said opening to produce a closed fluid-filled system of said unit, said tube and said actuator.

3. The method of making a medium filled system having a remote sensing unit connected to an operator by a tube containing a small amount of medium which comprises, connecting a sensing unit and an operator to a length of tube having a relatively large bore, filling said unit, said operator, and said bore with a medium to provide an open medium filled system, reducing the bore size by rolling said tube into a triangular shape, and sealing said system to prevent loss of said medium when the medium in said unit expands.

4. The improved method of making a noncompressible fluid-filled capillary tube having a bore size which increases the difficulty of removing all the compressible fluid, filling a tube having a large bore with noncompressible fluid at one end and insuring that all the compressible fluid is replaced, compressing said tube from a round to a triangular shape to reduce the area of the cross section of the bore whereby any excess fluid is removed from said one end, and sealing said tube at said one end.

References Cited in the file of this patent

UNITED STATES PATENTS

| 1,827,766 | Rosenburg | Oct. 20, 1931 |
| 2,047,296 | Squires | July 14, 1936 |
| 2,366,141 | Alderfer | Dec. 26, 1944 |